H. N. JOSLEYN.
TYPE WRITING MACHINE.
APPLICATION FILED NOV. 20, 1905.

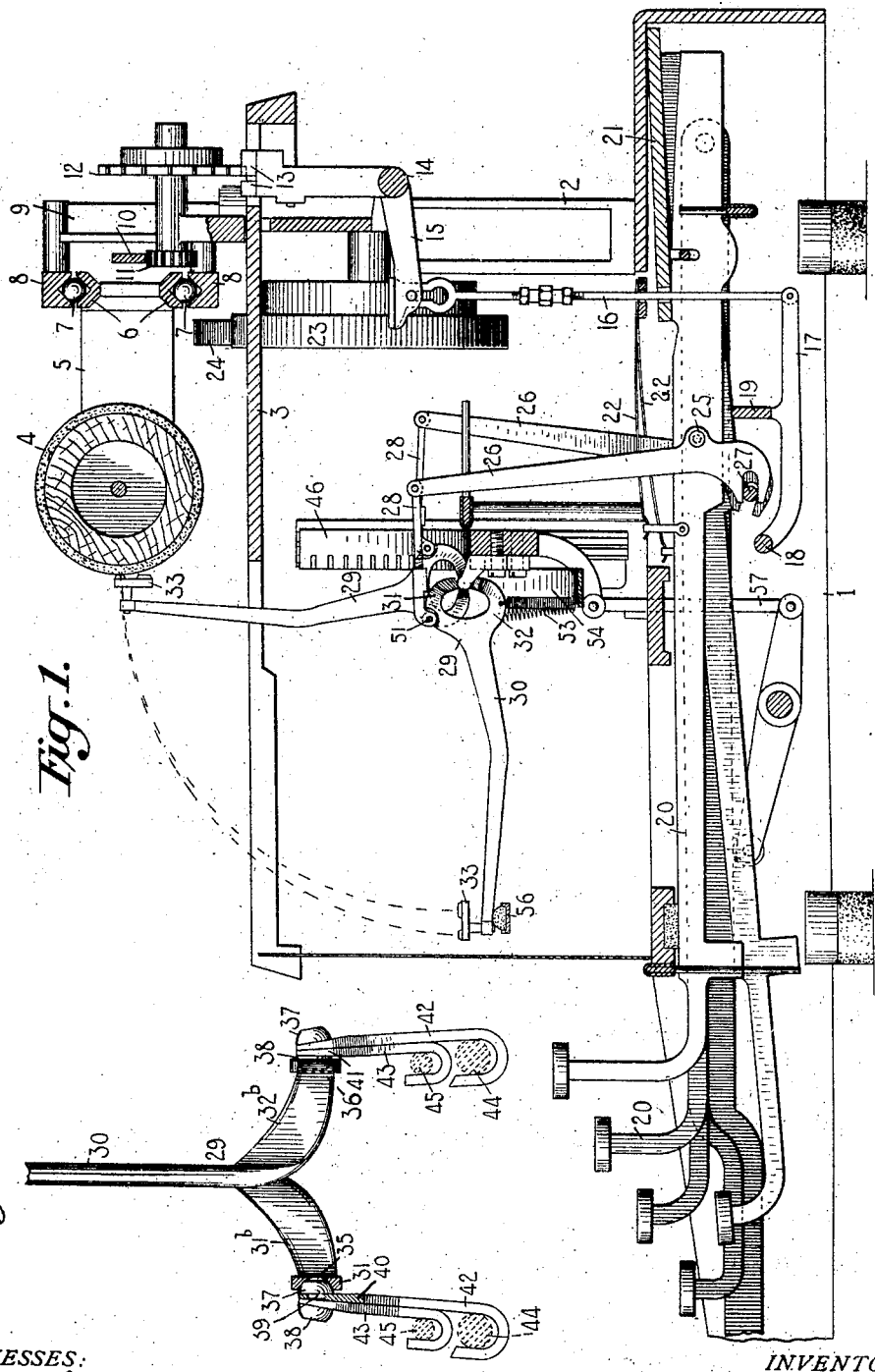

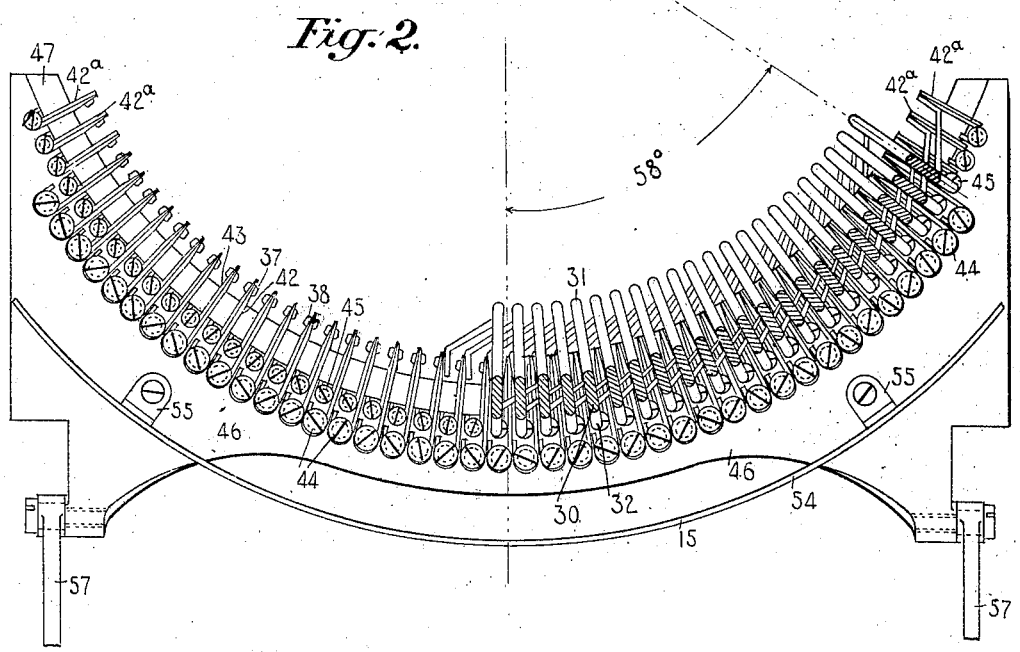
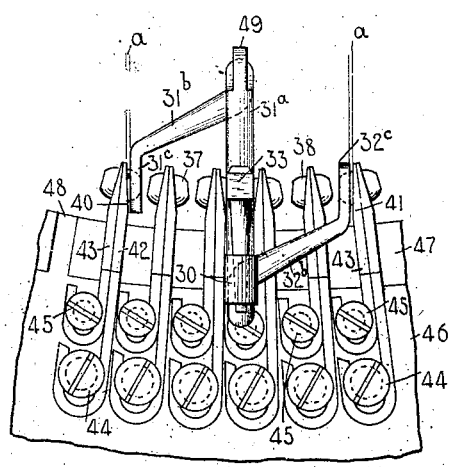
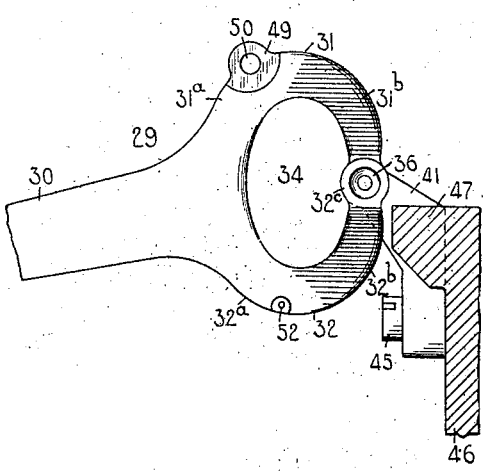

1,050,545.

Patented Jan. 14, 1913.
4 SHEETS—SHEET 3.

WITNESSES:
J. B. Deeves
M. W. Pool

INVENTOR.
Hubbard N. Josleyn
BY
Jacob Felbel
ATTORNEY.

H. N. JOSLEYN.
TYPE WRITING MACHINE.
APPLICATION FILED NOV. 20, 1905.

1,050,545.

Patented Jan. 14, 1913.

4 SHEETS—SHEET 4.

WITNESSES:
J. B. Neeves
M. W. Pool

INVENTOR.
Hubbard N. Josleyn
BY
Jacob Felbel
ATTORNEY

UNITED STATES PATENT OFFICE.

HUBBARD N. JOSLEYN, OF SYRACUSE, NEW YORK, ASSIGNOR TO THE MONARCH TYPEWRITER COMPANY, OF SYRACUSE, NEW YORK, A CORPORATION OF NEW YORK.

TYPE-WRITING MACHINE.

1,050,545.　　　　Specification of Letters Patent.　　Patented Jan. 14, 1913.

Application filed November 20, 1905. Serial No. 288,178.

*To all whom it may concern:*

Be it known that I, HUBBARD N. JOSLEYN, citizen of the United States, and resident of Syracuse, in the county of Onondaga and State of New York, have invented certain new and useful Improvements in Type-Writing Machines, of which the following is a specification.

My invention relates to typewriting machines of the type bar class, and has for its main object to provide improved constructions of type bars and type bar hangers for such machines.

Another object of the invention is to produce a set of type bars and hangers for a visible writing machine in which the hangers provide exceptionally wide bearings for the type bars.

A further object is to arrange these exceptionally wide bearings in a relatively small arc or space.

Another object is to space the type bars equally on a segmental support and obtain the usual unequal separation in the basket to provide for a clearance of the types without altering the structure of the bar itself.

Another object is to provide a uniform type bar for the whole series of type bars, each bar having unusually wide bearings and the series of bars being confined within an arc of 120° or less on the segmental support.

Another object is to provide means for removing type bars of the character described from their positions in the machine without disturbing the adjoining type bars, their hangers or connections.

Further objects than those recited will appear in the course of the following description.

To these ends my invention consists in the features of construction, combinations of devices and arrangements of parts hereinafter described at length and particularly pointed out in the claims.

Figure 8:
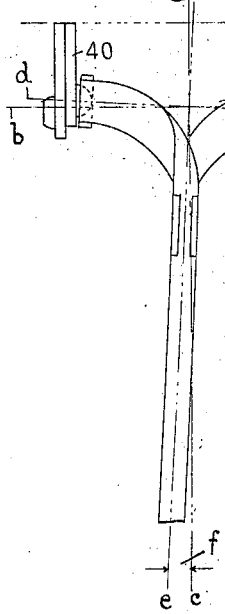
Figure 7:
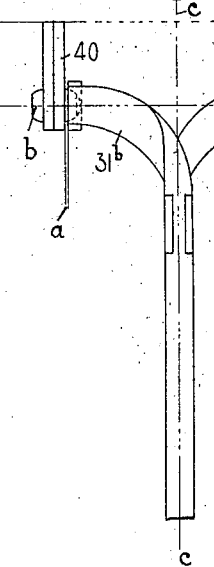
Figure 9:
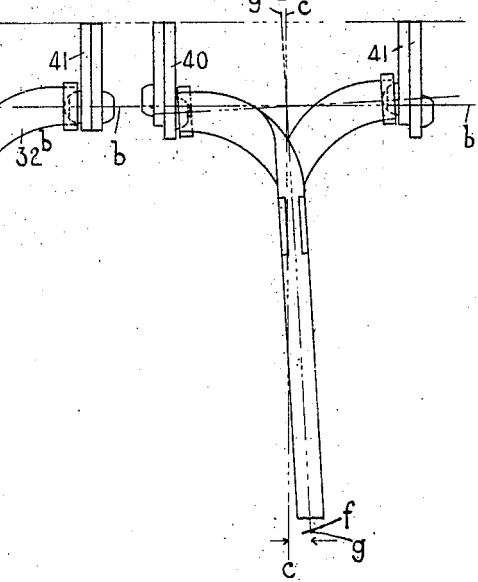
Figure 14:
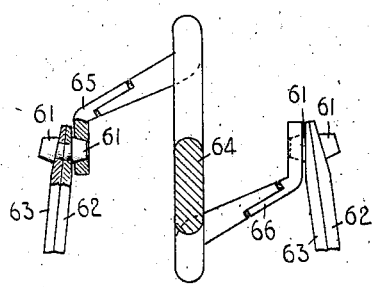
Figure 15:
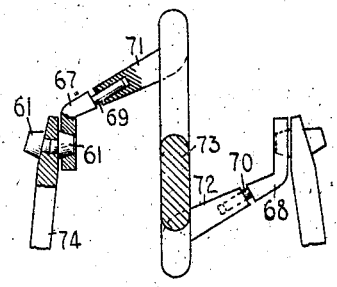
Figure 6:
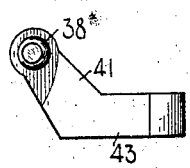
Figure 12:
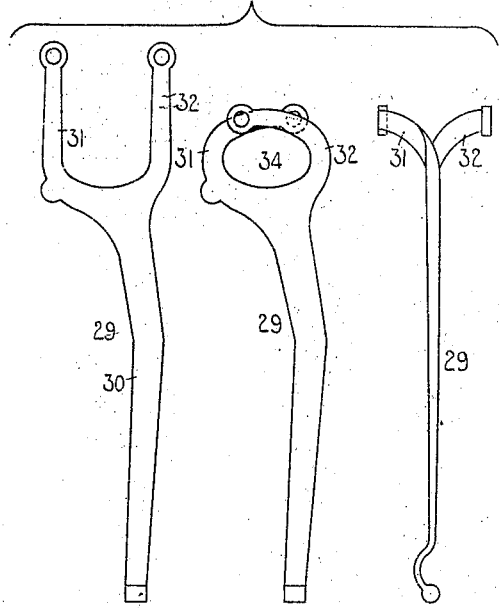
Figure 13:
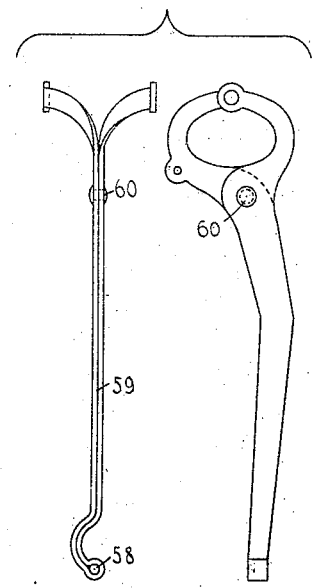
Figure 10:
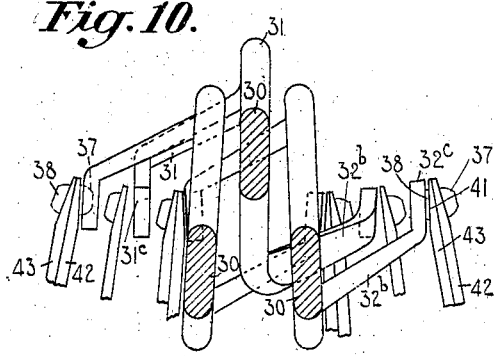
Figure 11:
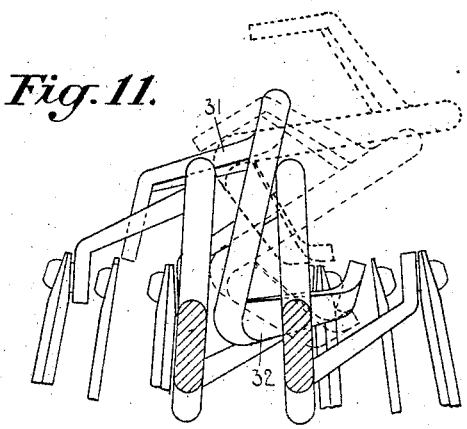

In the accompanying drawings, Figure 1 is a central longitudinal sectional view of a typewriting machine showing my invention applied thereto, such parts as are unnecessary to a complete understanding of my improvements being omitted. Fig. 2 is an enlarged front elevation of the segmental hanger support showing a series of hangers mounted thereon and part of the series of type bars mounted in their associate hangers. Fig. 3 is an enlarged fragmentary front elevation of the segment showing a plurality of hangers mounted thereon and a type bar in one of said hangers. Fig. 4 is an enlarged side elevation of one of the hangers and a part of its support, a portion of the type bar pivoted in said hanger being shown. Fig. 5 is an enlarged fragmentary front elevation of one of the type bars as it appears in printing position and showing the supports of said type bar. Fig. 6 is an enlarged side view of one of the hanger arms forming part of a hanger. Fig. 7 is a diagrammatic view illustrating one of the center bars and its supports, the view being taken from above the bar as it lies in the basket. Figs. 8 and 9 are views corresponding to Fig. 7 illustrating the arrangement of the type bars and supports at either side of the center group of bars. Fig. 10 is an enlarged fragmentary front view of three type bars and their hanger supports, the type bars being shown partly in section and the middle bar of the three being shown as it appears during the first stage of its removal from the machine. Fig. 11 illustrates the further stages in the progress of the middle bar of Fig. 10 during its removal from the machine. Fig. 12 shows the progressive stages in the manufacture of the type bar. Fig. 13 illustrates a modified form of type bar in plan view and side elevation. Fig. 14 is an enlarged front view partly in section of a modified construction of type bar and hanger. Fig. 15 is an enlarged front view partly in section of another modified construction of a type bar and its hanger supports.

My invention is shown as applied to a front-strike writing machine having the general characteristics of the machine commercially known as the Monarch typewriter, but I desire it to be understood that my invention may be adapted to other constructions of writing machines.

Referring first to Figs. 1 to 12, inclusive, and more especially to Fig. 1, 1 indicates the base of the machine supporting corner posts 2 which in turn sustain a top plate 3. Above the top plate is a platen 4 mounted in a carriage 5, the back rail 6 of said carriage being provided with longitudinal grooves which receive anti-friction balls 7, said balls also coöperating with grooved guide rails 8 secured to brackets 9 fixed to the top plate.

A rack 10 is mounted in the carriage and normally meshes with a pinion 11 which is operatively connected with an escapement wheel 12. Feed dogs 13 are adapted to coöperate with the escapement wheel 12, said feed dogs being mounted at the top of the upright arm of a pivoted vibratory dog rocker or carrier 14 having a horizontally disposed arm 15. A link 16 engages with the dog rocker arm 15, the lower end of said link being connected with a universal bar frame 17 pivoted at 18 in the base of the machine. The frame 17 carries a universal bar 19 which extends from side to side of the machine beneath a series of key levers 20, each of which is fulcrumed on a fulcrum plate 21 and is adapted when depressed during the operation of the machine to actuate the universal bar 19. Each key lever is provided with a restoring spring 22 which tends to restore it to normal position. The actuation of the universal bar 19 by any of the key levers, causes the feed dogs 13 to coöperate in a known manner with the escapement wheel 12, thereby permitting the carriage 5 and platen 4 to be drawn one letter space in printing direction under the influence of a spring drum 23 with which the carriage is connected by a band or strap 24. Pivoted at 25 to each key lever 20 is a sub-lever 26, the lower end whereof is slotted to coöperate with a fixed abutment 27 and the upper end whereof is connected by a link 28 with a type bar designated as a whole by the numeral 29.

The type bar 29 is best seen in Figs. 1, 3, 4 and 5 and comprises a body portion 30 and a forked portion comprising two arms or side members 31 and 32 each extending from the body portion 30 in a compound curve. The free end of the type bar is provided with a type block 33. The arm 31 extends upwardly from the top of the type bar and in the plane in which the type bar is designed to swing, that is, in the plane of rotation of the bar. Thereafter the arm 31 curves downwardly and at the same time is offset laterally from the side of the type bar toward the left at an angle of about 60°, the end of the arm 31 being bent downwardly and extending parallel with the side of the body portion of the bar. In Figs. 3 and 4 the upwardly extending part of the arm 31 is designated as 31$^a$, the downwardly and laterally extending portion as 31$^b$ and the end portion as 31$^c$. The arm 32 first curves or extends downwardly from the bottom of the body portion of the bar as indicated in the last mentioned figures at 32$^a$ and thereafter extends upwardly and at the same time is offset laterally to the right of the body portion of the bar, as indicated at 32$^b$, terminating in an end portion 32$^c$ parallel with the side of the body of the bar. Viewed from the side, as seen in Figs. 1 and 4, the arms 31 and 32 form an elliptical opening or eye 34 near the pivot end of the type bar. The end portions 31$^c$ and 32$^c$ are formed with cup-like depressions or seats 35 and 36 which receive pivotal bearings 37 and 38 shaped preferably like the segments of small spheres and provided with stems, the stem of the left-hand pivotal bearing 37 being shown in Fig. 5 and indicated by the numeral 39. The stems of the rounded bearings 37 and 38 are received in openings in ears 40 and 41 in hanger arms 42 and 43 and are fixed to said hanger arms in any preferred manner as by riveting, or a driving fit, or the like. The inner faces of the ears 40 and 41 are beveled so that said faces are in planes parallel with the portions 31$^c$ and 32$^c$ of the type bar arms but spaced some distance from the outer faces of said arms. The space or clearance between the outer faces of the ends 31$^c$ and 32$^c$ and the inner faces of the hanger ears 40 and 41 is best shown in Figs. 3 and 7 and is indicated by the reference character $a$. As clearly appears in Fig. 3 the left-hand hanger arm 42 is longer than the hanger arm 43. The lower ends of the hanger arms are hook-shaped so that in front view said arms resemble the letter J in shape. Securing screws 44 and 45 coöperate with the hanger arms, said screws being received in threaded openings in the front face of a vertically disposed hanger support or segment 46 and their heads engaging the two sides of the hooks at the lower ends of the hanger arms. The upper portion of the segment 46 is formed with a forwardly projecting rib 47, said rib being provided with a series of radial slots 48, each of which receives a hanger arm 42 and a hanger arm 43, said hanger arms coöperating with different type bars and being parts of different hangers.

The relative arrangement and disposition of the hanger arms are best shown in the front elevations (Figs. 2 and 3). It will be observed that the hook-like lower ends of the shorter hanger arms 43 are engaged by the heads of the smaller securing screws 45 and are thereby secured to the segment 46, the screws 45 lying in an arc of a circle and each being between two of the longer hanger arms 42. The screws 44 secure the longer hanger arms in place and lie in an arc of a circle greater than and concentric with the circle containing the smaller screws 45. The slots 48 in the segment 46 are spaced equal distances apart, and each is of such width as to permit the two adjoining hanger arms 42 and 43 to fit snugly in said slot so as to prevent any lateral or sidewise movement of said hanger arms. Each hanger arm contacts on one side with the wall of the slot and on the other side with the other hanger arm mounted in said slot.

The construction is such that when either of the securing screws 44 or 45, which hold said hanger arms in place on the segment, is loosened, the contiguous hanger arm 42 or 43 may be moved radially in the slot independently of the other hanger arm, but no sidewise movement of said loose hanger arm and no swinging movement of said hanger arm about its securing screw as a pivot is possible.

As is most clearly seen in Fig. 3 each type bar is positioned to lie midway between two adjoining slots 48. The hanger arm 43, which carries the right-hand pivotal bearing of the type bar, is the third of the shorter hanger arms counting from the type bar to the right, while the hanger arm 42 which carries the left-hand pivotal bearing of the type bar is the third of the longer hanger arms counting from the type bar to the left. It will, therefore, be understood that the two hanger arms 42 and 43 which go to make up the complete hanger for each type bar are separated from said bar by a considerable distance, giving a very broad bearing for the bar and that a plurality of bearings of other type bars are interposed between each type bar and its own bearing or pivotal points. It will further be understood that between the pivotal points of each bar, are interposed a plurality of pivotal points of other bars, each of said interposed pivotal points belonging to a different type bar, and each of the companion points of said interposed points being outside the space between the pivotal points of the first mentioned type bar.

The peculiar shape of the type bar when viewed in normal position from the front will be noted in Fig. 3, the bar having a shape like the letter Z at its pivotal end. By my invention it is possible to obtain a wide bearing for each type bar and at the same time employ substantially as many type bars in a given space as could be used with the narrowest possible bearing. In other words it is apparent that by my invention the usual number and compact arrangement of type bars may be obtained with the additional advantage of unusually wide bearings for the type bars. With a given number of bars and a given sized segment practically no more space is required for the system of type bars on account of the presence of my wide bearings because as has been observed the bearing arms of the type bars reach their pivotal points by passing through the eyes or spaces 34 of adjacent type bars. The relative dispositions of the bars in this respect are difficult to make clear in drawings, but will be understood from the description heretofore given and may be best seen in Fig. 2, wherein it will be observed, that the lower bearing arm of each type bar passes upwardly through the eyes in two type bars to the right of its own bar before reaching its pivotal bearing, while the upper bearing arm passes downwardly through the eyes in the two type bars to the left before reaching its pivotal bearing. The last three hanger arms at either end of the series are associated in their slots with blocks 42ª which have no bearing function but which serve to prevent lateral movement or displacement of the outside hanger arms.

In side view, as best seen in Figs. 1, and 4, the rear edges of the hanger arms are in contact with the front face of the segment, being maintained thereagainst by their securing screws, while the bearing ears of said hanger arms project toward the front of the machine and have also a slight upward tendency. A plurality of the bars near the center of the segment, preferably four bars on either side of the center or eight in all, have their bearing ears 40 and 41 extending forwardly an equal amount as appears in Fig. 7, so that their axes of rotation or pivotal axes (indicated by $b$—$b$ in said Fig. 7) are substantially in the same vertical plane as the printing line. The longitudinal axes (indicated by $c$—$c$) of the bars of this center group are parallel with each other and are normally perpendicular to the vertical plane passed through the printing line.

In order to obtain sufficient clearance for the types on the ends of the type bars, the group of bars to the left of the center group, and the group of bars to the right of the center group have their pivotal axes at an angle to the plane of the axes of the center group and to the plane of the printing line. Each member of the left-hand outside group of bars may be considered as represented in Fig. 8. The hanger ear 40 carrying the left-hand pivotal bearing of each member of this group extends forwardly a less distance than the corresponding hanger ear of any one of the center group of bars, and the right-hand hanger ear 41 of each member of the left-hand group extends forwardly or toward the front of the machine a greater distance than the corresponding hanger ear 41 of any one of the center group of bars. The result of this variation in the pivotal bearings of the members of the left-hand group is illustrated in Fig. 8, wherein it will be noted that the pivotal axis $d$—$d$ of the type bar is at an angle with the pivotal axis $b$—$b$ which it will be recalled also represents the plane of the printing point. The axes $b$—$b$ and $d$—$d$ intersect at a point midway between the pivots of the bar, this result being due to the fact that the left-hand ear 40 is shortened an amount equal to the amount by which the right-hand ear 41 is lengthened. Consequently the longitudinal axis $e$—$e$ of each type bar of the left-hand group is thrown or pitched at an angle to the longitudinal axes of the center bars, the angular amount of this pitch or throw being indicated in Fig. 8 by the letter $f$. The right-hand outside group of bars as represented in Fig. 9 have their longitudinal axes $g-g$ thrown or pitched to the right in a similar manner. By this arrangement of the bars of the outside groups sufficient clearance is obtained for the type blocks in the basket without affecting the alinement of the types. This result is due to the fact that though the planes of rotation of the outside bars (which planes may be considered as represented by the longitudinal axes $e-e$ and $g-g$ in Figs. 8 and 9) are at angles to the planes of rotation in which said bars would have swung if they had not been thrown out for clearance (said last named planes being represented by $c-c$), yet said angularly disposed planes (represented by $e-e$ and $g-g$) intersect or coincide in the plane of the printing point (represented by $b-b$), and consequently the type bars when brought to said printing plane will all strike at the same point.

It will be understood that the pivotal axes of the center group of bars all lie in a plane which may be represented by the line $b-b$ in Fig. 7, while the pivotal axes $d-d$ of the left-hand group lie in planes through the printing point which intersect the plane $b-b$ at equal angles and that a like arrangement is found in the right-hand group of bars represented in Fig. 9. All the bars of the center group lie substantially parallel with each other in the basket; all the bars of the left-hand group lie substantially parallel with each other in the basket; and all the bars of the right-hand group lie substantially parallel with each other in the basket, the bars of the left-hand and right-hand groups being at angles with the bars of the center group. There is no difference in the construction or proportions of the type bars of the center and side groups, and the only difference between the set of hangers in which the center group of bars are mounted and the sets of hangers in which the side groups are mounted is the difference in the length of the forwardly projecting ears 40 and 41, as indicated in the figures now under discussion. The clearance $a$ (Figs. 3 and 7) between the bearing arms of the type bars and the inner faces of the hanger ears is sufficient to permit of the necessary angular pitching of the bars of the side groups without causing any interference or contact between the faces of the hanger arms and the bearing arms of the type bars. The spherical or rounded shape of the type bar pivots permits of as free and unobstructed rotary movement of the side bars as of the center bars.

The upper arm 31 of each type bar is flattened or compressed as indicated at 49 (Fig. 4) and the flattened portion is formed with a hole 50 which is adapted to receive a pin 51 carried at the forward end of the link 28. The lower arm of the type bar is formed with a small hole 52 which receives the upper end of the coiled restoring spring 53, the lower end of said spring being connected with a segmental band of metal 54 which is secured to brackets 55 fixed to the segment 46. In normal position the free ends of the type bars lie in contact with a type rest or pad 56. The type bar segment 46 is connected by links 57 with the segment shifting mechanism common to the Monarch machine, but it is to be understood that any other form of segment shifting mechanism may be employed or that the segment may be fixed and the platen made shiftable, or some other arrangement may be made without affecting the essentials of my invention.

With the type bars and their supports or hangers arranged in the manner that I have described I am enabled to provide a bearing for each type bar several times wider than that usually obtainable in visible writing machines and at the same time to secure a particularly compact assemblage of the type bars on the type bar support. The number of type bars needed in an eighty-four character shift machine is forty-two and in practice I have found that such a number of bars of ordinary length may be assembled within an arc of 120° or less. This is possible because of my improved method of nesting the bars and their bearing arms, which latter, it will be observed, extend in the plane of rotation of the bar, first away from the axial plane of said bar and thereafter toward the axial plane of the bar and at the same time laterally away from the sides of the bar and from the plane in which said bar rotates. By the axial plane of the bar I desire to be understood as meaning that plane which embraces the pivotal and longitudinal axes of the bar.

The bar illustrated in Figs. 1 to 12, inclusive, and as heretofore described is preferably formed of a solid piece of metal, the steps in the formation of said bar being illustrated in Fig. 12. The left-hand member of the group shown in Fig. 12 represents the piece after it has been drop-forged, the arms 31 and 32 being straight at this stage. In the central member of the group these arms 31 and 32 are shown curved or bent inward toward each other forming the eye 34 in the bar. The right-hand figure of the group represents the final stage in the shaping of the bar, the arms 31 and 32 being shown bent outward laterally to the positions represented in Figs. 1 to 11.

Figs. 10 and 11 illustrate the mode of dismounting or removing one of the type bars from its place in the machine. Fig. 10 shows a group of three type bars with the middle bar of the group in course of removal. As indicated in said Fig. 10, the hanger arms of the bar to be removed are first taken out and the type bar having been disconnected from its link 28 is then raised from the basket at an angle of about 30°. The lifting of the type bar from the basket turns the two bearing arms of the bar rearwardly to a position where they will not clash or interfere with the bearing arms of the adjacent bars at either side. From the position indicated in Fig. 10 the middle type bar is gradually turned or twisted to the right to the position indicated by the full lines in Fig. 11, and thereafter is still further turned or twisted to the dotted line positions indicated in said Fig. 11. The upper bearing arm 31 is first cleared of the adjoining left hand hanger and then the lower bearing arm 32 is worked around through the space between the bearing arms of the adjoining right-hand hanger. To accomplish this result it is necessary to raise and lower the type bar alternately. When a type bar is to be inserted in place in the machine the operation just described is reversed, the bearing arm 32 being first worked into position and thereafter the bearing arm 31 being adjusted in place. Then the hanger arms associated with the type bar are introduced into the slots 48 in the segment 46 and made fast to said segment by securing screws 44 and 45.

Various changes in the construction and arrangements of the different parts may be made without departing from the spirit and scope of my invention and some examples of these changes are illustrated in Figs. 13 to 15, inclusive, of the drawings, which will now be briefly described.

Fig. 13 shows a top plan view and side elevation of a modified form of type bar constructed of a single piece of sheet metal. The metal strip composing the bar is folded to form an eye 58 for the type block, and the body portion 59 of the bar comprising two thicknesses or plies of metal is held together near the rear end of the bar as by a rivet 60. The rear ends of the plies are curved and bent to form bearing arms and an eye similar to those already described.

In Fig. 14 the pivotal bearings 61 are shown as conical in shape instead of spherical, the mode of attaching said conical bearings to the hanger arms 62 and 63 being similar to that hitherto described. The type bar in this case is made in three separate parts, a main part 64 and bearing ends 65 and 66, said bearing ends being provided with conical openings or seats for the pivotal bearings. In assembling the parts, the bearing ends or sections 65 and 66 are first adjusted on the bearings 61, and the type bar proper is then arranged in printing position. With the parts so maintained the joints or splices between the three sections are soldered together. With the conical pivots just described it would be necessary in order to adjust the type bar to shift both the bar and the hanger arms in unison. In this construction when it is desired to remove a type bar from its place in the machine, the splices are unsoldered and the type bar removed, the operation being somewhat simpler than is the operation of removing the one piece bar.

In the modification shown in Fig. 15, the two bearing ends or sections 67 and 68 have their inner ends reduced to form small stems 69 and 70 which are adapted to fit into suitable holes drilled into the ends of the arms proper 71 and 72, which arms extend laterally from the body of the bar 73. By this construction the parts may be readily held together while the bar is adjusted in the basket and brought to the printing point, and then the soldering operation hitherto described may be easily performed without likelihood of disarranging the parts.

In Fig. 15 the two separate and independent hanger sections in each slot are replaced by a single piece 74 and the coned bearings 61 are forced into opposite ends of a single perforation formed in said piece 74.

The portions 31$^a$ and 32$^a$ of each bar, the sides of these portions being flat and continuations of the sides of the body 30, may be regarded as a yoke, and the portions 31$^b$, 31$^c$ and 32$^b$, 32$^c$ as arms connected by the yoke with the body or stem 30. Projections of the arms of a bar on a plane perpendicular to its pivotal axis extend in different directions from the axis, as plainly appears by Fig. 4.

Various other changes besides these described may be made without departing from the gist of my invention.

What I claim as new and desire to secure by Letters Patent, is:—

1. A type bar comprising a stem, and two bearing arms that extend from the median plane of the stem to points on the pivotal axis of the bar that are on opposite sides of and equally distant from that plane, the projections of the arms on a plane perpendicular to the axis extending in different directions from the axis, and these arms constantly diverging laterally from said median plane to points adjacent to the pivotal axis and equidistant from that plane.

2. A type bar comprising a stem, a yoke, and two bearing arms, the yoke being united with the stem and being cut from end to end by the median plane of the stem, and the bearing arms being united with the yoke at its ends and extending from it on opposite sides of said plane to the pivotal axis of the bar, and being curved constantly from the yoke lengthwise of the bar and constantly diverging laterally from said median plane, to points adjacent to the pivotal axis and on opposite sides of the plane that contains said axis and cuts the yoke midway between its ends.

3. A type bar comprising a stem, and two bearing arms that extend from the median plane of the stem to points on the pivotal axis of the bar that are on opposite sides of and equally distant from that plane, the projections of the arms on a plane perpendicular to the axis extending in different directions from the axis, and these arms being of the same shape and size and constantly diverging from said median plane to points adjacent to the pivotal axis and equidistant from that plane.

4. A type bar comprising a stem, a yoke, and two bearing arms, the yoke being united with the stem and lying from end to end on opposite sides of the median plane of the stem, and the bearing arms being of the same shape and size and being united with the yoke at its ends and constantly diverging from said median plane on opposite sides thereof to points adjacent to the pivotal axis and equidistant from that plane.

5. A type bar comprising a stem, a yoke, and two bearing arms, the yoke being united with the stem and lying from end to end on opposite sides of the median plane of the stem, and the ends of the yoke being on opposite sides of and substantially equidistant from a plane containing the pivotal axis and cutting the type of the bar, and the bearing arms being united with the yoke at its ends and constantly diverging from said median plane, on opposite sides thereof, to points adjacent to the pivotal axis and equidistant from the median plane and on opposite sides of said other plane.

6. In a typewriting machine, the combination of a plurality of type bars, said bars having lateral bearing arms, a pair of independent hanger arms for each bar, and bearing connections between said hanger arms and bearing arms, the members of a pair of hanger arms having intervening between them members of other pairs of hanger arms, and the axes of rotation of said bars forming chords of a circle whose center is the printing point of the machine.

7. In a typewriting machine, the combination of a plurality of type bars, said bars having lateral bearing arms, a pair of independent hanger arms for each bar, bearing connections between said hanger arms and bearing arms, and means to adjust said hanger arms, the members of a pair of hanger arms having intervening between them members of other pairs of hanger arms, and the axes of rotation of said bars forming chords of a circle whose center is the printing point of the machine.

8. In a typewriting machine, the combination of a plurality of type bars, each bar having (1) an arched fulcrum end, the arched portion whereof forms a yoke that is substantially radial to the printing center of the machine, and (2) bearing arms springing laterally from the ends of the yoke, a pair of independently mounted hanger arms for each type bar, and bearing connections between the hanger arms and bearing arms, the members of each pair of hanger arms having intervening between them members of other pairs of hanger arms.

9. In a typewriting machine, the combination of a plurality of type bars, each bar having (1) an arched fulcrum end the arched portion whereof forms a yoke that is substantially radial to the printing center of the machine, and (2) bearing arms springing laterally from the ends of the yoke, a pair of independently mounted hanger arms for each type bar, and bearing connections between said hanger arms and bearing arms, said bars being mounted in nested arrangement with the bearing arms of one bar intersecting the planes of rotation of one or more adjacent bars.

10. In a typewriting machine, the combination of a plurality of type bars, each bar formed at its fulcrum end with (1) an arched portion, said arched portion forming a yoke and being transverse lengthwise to the axis of rotation of the bar, and (2) a lateral bearing arm springing from each end of the yoke, and a pair of independently mounted hanger arms for each bar, the members of the pair having bearing connections with the bearing arms of a bar, and said bars being mounted with their bearing arms in nested arrangement one with another.

11. In a typewriting machine, the combination of a plurality of type bars, each formed at its fulcrum end with (1) an arched portion, said arched portion forming a yoke and being transverse lengthwise to the axis of rotation of the bar, and (2) a lateral arm extending from the ends of the yoke obliquely to the plane of rotation of the bar, a pair of separately mounted hanger arms for each bar, and bearing connections between said hanger arms and the free ends of said bearing arms.

12. In a typewriting machine, the combination of a plurality of type bars, each bar having a pair of bearing arms extending laterally from the plane of rotation of the bar, an arched portion that forms a yoke connecting the said bearing arms to the shank or body of the bar, a pair of separately mounted hanger arms for each bar, and bearing connections between said hanger arms and said bearing arms.

13. In a typewriting machine, the combination of a plurality of type bars, each bar having (1) a pair of bearing arms extending laterally from the plane of rotation of the bar, and (2) an arched portion that forms a yoke connecting the said bearing arms to the shank or body of the bar, said yoke being transverse lengthwise to the axis of rotation of the bar, a pair of separately mounted hanger arms for each bar, and bearing connections between said hanger arms and said bearing arms.

14. In a typewriting machine, the combination of a plurality of type bars, each bar having (1) a pair of bearing arms extending laterally from the plane of rotation of the bar, and (2) an arched portion that forms a yoke connecting the said bearing arms to the shank or body of the bar, the arms of one bar extending beyond the yokes of adjacent bars, a pair of separately mounted hanger arms for each bar, and bearing connections between said hanger arms and said bearing arms.

15. In a typewriting machine, the combination of a plurality of type bars, each bar having (1) a pair of bearing arms extending laterally from the plane of rotation of the bar, and (2) a yoke uniting said bearing arms to the shank or body of the bar, said yoke being at a distance from the axis of the bar and its median plane coinciding with the plane of rotation of the bar, a pair of separately mounted hanger arms for each bar, and bearing connections between said hanger arms and said bearing arms.

16. In a typewriting machine, the combination of a plurality of type bars, each bar formed with (1) a shank carrying the type at one end thereof, (2) divergent branches that form a yoke springing from said shank at a point distant from the axis of rotation of the bar, said yoke extending lengthwise in a direction transverse to said axis, and (3) bearing arms extending from said branches laterally on each side of the plane of rotation of the bar, and a pair of separately mounted hanger arms, said hanger arms having bearing connections with the bearing arms.

17. In a typewriting machine, the combination of a plurality of separately mounted hanger arms, said hanger arms arranged in pairs with adjacent hanger arms pertaining to different pairs, and a plurality of type bars, each type bar having lateral bearing arms connecting it with its pair of hanger arms, and an arched member that forms a yoke connecting said bearing arms with the shank of the bar, said yoke forming a clearance for the bearing arms of adjacent bars.

18. In a typewriting machine, the combination of a plurality of adjacently mounted type bars, and a pair of separately mounted hanger arms for each bar, the members of each pair non-adjacently mounted, each type bar having (1) lateral bearing arms connecting the bar with its pair of hanger arms, and (2) an arched offset connecting said bearing arms to the shank of the bar, said arched offset forming a clearance for the bearing arms of bars having their arched offsets on opposite sides of said arched offset.

19. In a typewriting machine, the combination of a hanger support, two hanger arms, screws securing said arms in place, a pivotal bearing projection on each hanger arm, and a type bar, having an arched offset and lateral bearing arms provided with seats which engage said bearing projections, the length of the offset being transverse to the pivotal axis of the bar.

20. In a typewriting machine, the combination of a hanger support, two hanger arms mounted on said support, a bearing projection fast on each arm, and a type bar, having lateral bearing arms, seats in said bearing arms engaging the said bearing projections of the hangers, and an arched offset connecting said bearing arms to the shank of the bar, the length of the offset being transverse to the pivotal axis of the bar.

21. In a typewriting machine, the combination of a hanger support, two independent hanger arms, screws securing said hanger arms in place, said hanger arms being separately removable and separately adjustable, a pivotal bearing on each hanger arm, and a type bar, having an arched offset and lateral bearing arms, the length of the offset being transverse to the pivotal axis of the bar and said bearing arms having indentations coöperating with said pivotal bearings on the hanger arms.

22. In a typewriting machine, the combination with a type bar and its hanger of pivots comprising spherical segments that fit in spherical seats and that are separately movable transversely of the pivotal axis.

23. In a typewriting machine, the combination with a type bar and its hanger of pivots comprising spherical segments that are fast on the hanger and fit in spherical seats in the type bar and that are separately movable transversely of the pivotal axis.

24. In a typewriting machine, the combination with a type bar and a hanger comprising arms on and between which the type bar is mounted, of pivots comprising spherical segments that fit in spherical seats, the arms of the hanger being separately movable transversely of the pivotal axis.

25. In a typewriting machine, the combination with a type bar and a hanger comprising arms on and between which the type bar is mounted, of pivots comprising spherical segments that are fast on the hanger arms and fit in spherical seats in the type bar, the hanger arms being separately movable transversely of the pivotal axis.

26. In a typewriting machine, the combination of a hanger support, a hanger comprising two arms, screws securing said arms in place, a pivotal bearing comprising a spherical segment, fixedly secured to each of said hanger arms, and a type bar having arms provided with bearing cups or seats which coöperate with said bearings.

27. In a typewriting machine, the combination of a hanger support, a series of type bar hangers radially secured to said support, each of said hangers comprising two independent arms having beveled ends, rounded pivotal bearings on the beveled ends of said hanger arms, and a type bar having arms terminating in portions parallel with the beveled ends of said hanger arms, said type bar arms being provided with cups which coöperate with said rounded bearings on said hanger arms.

28. In a front-strike typewriting machine, the combination of a platen, a hanger support, a plurality of hangers on said support, and type bars pivoted in said hangers, the pivotal axis of one type bar being in the plane of the printing line, the pivotal axis of another type bar being at an angle to the plane of the printing line and the planes of rotation of the type bars meeting in the plane of the printing line.

29. In a front strike typewriting machine, the combination of a platen, a plurality of groups of type bars, and hangers for said type bars, the members of each group of type bars lying substantially parallel with each other in the basket and the members of different groups of type bars being at angles to each other.

30. In a front-strike typewriting machine, the combination of a platen, a plurality of sets of hangers, and groups of type bars mounted in the hangers of said sets, the members of each group of type bars lying substantially parallel with each other in the basket and the members of different groups of type bars being at angles to each other and the pivotal axes of the bars of different groups being at angles to each other.

31. In a front-strike typewriting machine, the combination of a platen, a plurality of sets of hangers, and groups of type bars mounted in the hangers of said sets, the members of each group of type bars lying substantially parallel with each other in the basket and the members of different groups of type bars being at angles to each other, and the pivotal axes of the bars of different groups being at angles to each other, the pivotal axes of the bars of one group lying in the same plane and the pivotal axes of the several bars of another group lying in different planes which are parallel with one another.

32. In a front-strike typewriting machine, the combination of a platen, a plurality of sets of hangers, and groups of type bars mounted in the hangers of said sets, the members of each group of type bars lying parallel with each other in the basket and the members of different groups of type bars being at angles to each other, and the pivotal axes of the bars of different groups being at angles to each other, the pivotal axes of the type bars of one group lying in the plane of the printing line and the pivotal axes of the type bars of another group lying in planes at angles to said printing line.

33. In a front-strike typewriting machine the combination of a platen, a hanger support, sets of hangers secured to said support, and groups of type bars pivotally mounted in said sets of hangers, each hanger having two bearing arms, the bearing arms of the hanger of one group terminating at equal distances from the hanger support and the two bearing arms of each of the hangers of another group terminating at unequal distances from said hanger support.

34. In a front-strike typewriting machine, the combination of a platen, a hanger support, sets of hangers secured to said support, and type bars pivotally mounted in said hangers, each hanger having two arms, the arms of the hanger of one set terminating at equal distances from the face of the hanger support, said distances being the same for each hanger of said group and the two arms of each of the hangers of another set terminating at unequal distances from said hanger support, the corresponding arms of each of the hangers of said last named set terminating at equal distances from said hanger support.

35. In a front-strike typewriting machine, the combination of a platen, a hanger support, sets of hangers secured to said support, each hanger comprising two arms, pivotal bearings on each of said arms, and type bars mounted to turn on said pivotal bearings, the pivotal bearings at the ends of the arms of one set of hangers being at equal distances from the face of the segment and the pivotal bearings of each hanger of another set being at unequal distances from the face of the segment.

36. In a front-strike typewriting machine, the combination of a platen, a hanger support, sets of hangers secured to said support, each hanger comprising two arms, pivotal bearings on each of said arms, and type bars mounted to turn on said pivotal bearings, the pivotal bearings of one set of hangers being at equal distances from the face of the segment and the pivotal bearings of each hanger of another set being at unequal distances from the face of the segment, the pivotal bearings of the first named set lying in a plane which coincides substantially with the plane of the printing line on the platen and the pivotal bearings of each hanger of the last named set each lying in a plane 37. In a front-strike typewriting machine, the combination of a platen, a hanger support, sets of hangers secured to said support, each hanger comprising two arms, pivotal bearings on each of said arms, and type bars mounted to turn on said pivotal bearings, the pivotal bearings of one set of hangers being at equal distances from the face of the segment and the pivotal bearings of each hanger of another set being at unequal distances from the face of the segment, the pivotal bearings of the first named set lying in a plane which coincides with the plane of the printing line on the platen and the pivotal bearings of each hanger of the last named set lying in a plane which intersects the plane of the printing line, the planes of the pivotal axes of the last named set being at equal angles with the plane of the printing line.

38. In a typewriting machine, the combination of a hanger support provided with slots, a plurality of hangers seated in each of said slots in contact with one another, means for preventing longitudinal movement of each of said hangers, lateral movement being prevented by the side of the slot in which said hanger is mounted and by the hanger with which said hanger contacts, and type bars mounted in said hangers.

39. In a typewriting machine, the combination of a hanger support having a lip or rib provided with radial slots, a plurality of hangers in each of said slots, securing screws for said hangers, lateral movement of each of said hangers being prevented by the sides of its slot and the hanger with which it is associated in said slot, and type bars mounted in said hangers.

40. In a typewriting machine, the combination of a slotted hanger support, groups of J-shaped hanger arms on said support, the arms of each group differing in length, type bars mounted in said hanger arms, screws for securing said hanger arms to said support, a long and short hanger arm being arranged in each of said slots and contacting with the sides of said slot to prevent lateral displacement of either hanger arm.

41. In a typewriting machine, the combination of a slotted hanger support, groups of J-shaped hanger arms on said support, the arms of each group differing in length, type bars mounted in said hanger arms, screws for securing said hanger arms to said support, a long and short hanger arm being arranged in each of said slots and contacting with the sides of said slot to prevent lateral displacement of either hanger arm, the securing screws permitting radial adjustment of said hanger arms.

42. In a typewriting machine, the combination of a hanger support having a lip or rib provided with radial slots, a plurality of hanger arms in each of said slots, type bars pivoted on said hanger arms, and securing screws for said hanger arms, said screws lying in arcs of concentric circles, lateral movement of each of said hanger arms being prevented by the sides of its slot and the hanger arm with which it is associated in said slot.

43. In a typewriting machine, the combination of a slotted hanger support, groups of J-shaped hanger arms on said support, the arms of one group differing in length from the arms of another, type bars mounted in said hanger arms, screws for securing said hanger arms to said support, a long and short hanger arm being arranged in each of said slots and contacting with the sides of said slot to prevent lateral displacement of either hanger arm, the securing screws permitting radial adjustment of said hanger arms, and the securing screws of the groups of hangers lying in arcs of concentric circles.

Signed at Syracuse, in the county of Onondaga, and State of New York, this 16th day of November, A. D. 1905.

HUBBARD N. JOSLEYN.

Witnesses:
JOHN S. MITCHELL,
H. A. AUMENT.